Sept. 20, 1960
J. HARTMANN
2,953,415
BEARING ASSEMBLY
Filed March 8, 1955
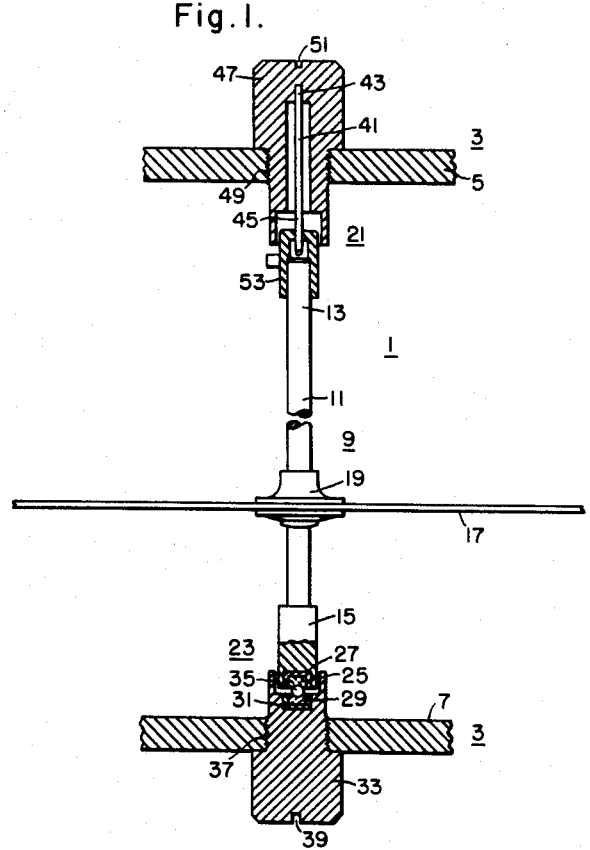
INVENTOR
Johann Hartmann.
BY
ATTORNEY
WITNESSES Patented Sept. 20, 1960

2,953,415
BEARING ASSEMBLY

Johann Hartmann, Nurnberg, Germany, assignor to Siemens-Schuckertwerke Aktiengesellschaft, Erlangen, Germany, a corporation of Germany Filed Mar. 8, 1955, Ser. No. 492,836

Claims priority, application Germany Mar. 30, 1954

4 Claims. (Cl. 308—158)

This invention relates to bearing assemblies and has particular relation to upper guide bearing assemblies for electrical instruments including rotor structures mounted for rotation relative to stator structures about a vertical axis.

Electrical instruments have previously been constructed which include a rotor structure mounted for rotation relative to a stator structure. Such rotor structures have included a shaft supported for rotation about a vertical axis by means of upper and lower bearing assemblies. The construction of such bearing assemblies has taken a variety of forms. For example, a guide bearing assembly has been provided which includes a metallic ring bearing having a lateral bearing surface adapted to engage a metallic needle shaft carried by an upper portion of an associated stator structure. The ring bearing is carried by the rotor shaft for rotation therewith relative to the needle shaft.

Such metallic ring bearings have presented a number of difficulties in the past. As an example, it has previously been necessary to employ lubrication for such bearings to maintain the frictional properties thereof at a minimum level. The use of such lubrication has resulted in a number of disadvantages. Furthermore, the use of metallic bearings has resulted in an excessive noise level caused by oscillations of the associated rotor structure. In addition, a number of difficulties have been encountered in the assembly of metallic ring bearings to the associated rotor shaft.

According to the present invention, the above referred to disadvantages are overcome by the provision of an upper guide bearing assembly for an electrical instrument which includes a bearing member formed of a synthetic resin material. Any suitable resin material having the desired properties may be employed.

According to a preferred embodiment of the invention, a bearing member is formed of a polyurethane resin. Polyurethane resins employed in the practice of the present invention are obtained from polyurethane-forming reactants as, for example, by reacting a polyisocyanate and a polyhydric alcohol.

It has been observed that bearing members formed of polyurethane resins possess very desirable properties as compared to bearings constructed of metallic materials. Such a resin exhibits superior wearing qualities as compared to metallic materials. Furthermore, bearings formed of polyurethanes or other synthetic resins having similar properties are self-lubricating and require no applied lubricants. These synthetic resins are readily machineable and also possess a certain amount of resiliency.

Other synthetic resins possessing these desirable properties are commercially available. For example, a linear polyamide known commercially as nylon has been employed with satisfactory results in bearing members constructed in accordance with the invention.

According to a specific embodiment of the invention a bearing member is cast from a suitable synthetic resin in the form of a cylinder having a central cavity opening at each end of the bearing member. The cavity is proportioned to receive a separate one of the needle shaft and the rotor shaft from each end of the bearing member.

The bearing member is conveniently cast with integral projections or ribs which extend from the lateral surface thereof. Such ribs are effective in delaying the cooling rate of the cast bearing to provide a resilient construction of the bearing member. The ribs further facilitate the installation and removal of the bearing member from the associated rotor shaft. With such construction, the bearing member is conveniently press-fit over the rotor shaft to provide a rigid assembly.

The bearing member is preferably formed with a shoulder of the central passage adapted to engage the rotor shaft to prevent relative displacement of the bearing member and the rotor shaft axially of the rotor shaft in a direction toward the upper portion of the associated stator structure.

It is, therefore, an object of the invention to provide an improved bearing member.

It is another object of the invention to provide an upper guide bearing assembly for an electrical instrument including a bearing member of improved construction.

It is a further object of the invention to provide an upper guide bearing assembly for an electrical instrument including a bearing member of resilient one-part construction formed of a synthetic resin material.

Other objects of the invention will become apparent from the following description taken in conjunction with the accompanying drawings, in which:

Figure 1 is a view in front elevation with parts shown in section of portions of an electrical instrument embodying the invention;

Fig. 2 is a enlarged view in section of a portion of Fig. 1; and

Fig. 3 is a view taken along the line III—III of Fig. 2.

Referring to the drawings, there is illustrated in Fig. 1 portions of an electrical instrument represented generally by the numeral 1. For purposes of discussion the instrument 1 is assumed to be an alternating-current watt-hour meter having a rotor structure mounted for rotation relative to a stator structure about a vertical axis. However, the invention is applicable to other devices having rotor structures mounted for rotation about an axis extending in any desired direction.

The meter 1 includes a stator structure 3 having an upper portion 5 and a lower portion 7. The meter 1 is further provided with a rotor structure 9 including a shaft 11 having upper and lower end portions 13 and 15. The structure 9 includes a disc 17 which is secured to the shaft 11 by a suitable hub 19 for rotation relative to the structure 3. The disc 17 is rotatable under the influence of magnetic flux produced by a magnetic structure (not shown) of the meter 1.

In order to mount the structure 9 for rotation relative to the structure 3 suitable bearing means are provided. As illustrated in Fig. 1, the meter 1 is provided with an upper bearing assembly 21 and a lower bearing assembly 23. In the specific embodiment of Fig. 1, the assembly 23 includes a bearing member 25 carried by a bearing mount 27 which is secured to the portion 15 of the shaft 11 in any suitable manner. An additional bearing member 29 is also provided for cooperation with the member 25. The member 29 is similarly carried by a bearing mount 31 which is secured to a portion 33 of the stator structure 3.

Each of the bearing members 25 and 29 is provided with a cupped portion as shown in Fig. 1. The members 25 and 29 are mounted relative to each other with the cupped portions thereof defining a cavity proportioned to receive a suitable ball member 35. The members 25 and 29 are preferably formed of materials such as glass or sapphire, although other suitable materials may be employed. The member 35 is preferably formed of a material such as steel and is provided with a highly polished surface in order to maintain friction between engaging surfaces of the members 25, 29 and 35 at a minimum level. With such construction of the assembly 23, a substantially frictionless support is provided for the rotor structure 9.

The portion 33 of the stator structure 3 is conveniently in the form of a threaded screw member having external threads 37 adapted to cooperate with internal threads of the portion 7 of the structure 3. Such arrangement permits ready installation and removal of the bearing member 29 relative to the structure 3. The member 33 may have a slot 39 proportioned to receive a suitable tool for the purpose of effecting rotation of the member 33 relative to the structure 3.

The upper bearing assembly 21 includes a needle shaft 41 having end portions 43 and 45 with the portion 43 secured to a portion 47 of the stator structure 3. As shown, the diameter of the shaft 41 is somewhat smaller than the diameter of the shaft 11. The portion 47 of the structure 3 may be similar in construction to the portion 33 comprising a threaded screw member having external threads 49 and a tool receiving slot 51. The portion 5 of the structure 3 is provided with internal threads proportioned to receive the threads 49 to permit rotation of the member 47 relative to the structure 3.

In order to guide the rotor shaft 11 for rotation relative to the structure 3 about a vertical axis, a bearing member 53 is provided which is carried by the shaft 11 for cooperation with the shaft 41. Guide bearings for electrical instruments have previously been constructed in a variety of forms. It has previously been the practice to form such guide bearings of metallic materials such as bronze or steel. Such construction has resulted in a number of disadvantages.

In order to maintain friction between the engaging metallic bearing and needle shaft at a minimum level, lubrication of the metallic bearings has previously been required. The employment of lubricants has resulted in the expenditure of considerable time and money in the assembly of upper guide bearing assemblies. Furthermore, the employment of certain lubricants has adversely affected the performance characteristics of electrical instruments, especially in installations subjected to wide variations in temperature.

In order to assemble metallic bearing members to rotor shafts it has previously been necessary to perform a number of difficult machining operations upon the shafts and bearing members. In addition, removal of metallic bearings from the associated rotor shafts for replacement or other purposes has been quite time consuming. It has also been observed that the use of metallic bearings has resulted in excessive noise levels caused by oscillations of the associated rotor structures.

In order to overcome these and other disadvantages characteristic of prior art guide bearings the present invention provides that the bearing member 53 be formed of a synthetic resin material. Any suitable resin material may be employed.

According to a preferred embodiment of the invention, the member 53 is formed of a polyurethane synthetic resin. Polyurethanes suitable for bearing members constructed in accordance with the invention may be obtained by a number of reactions. For example, polyurethanes suitable for use in the present invention are produced by reacting a polyisocyanate, and particularly a diisocyanate, with a polyhydric alcohol, with a glycol or with an alkyd resin having unreacted hydroxyl groups as may be derived by reacting a molar excess of polyhydric alcohol with a polybasic acid or an anhydride.

Examples of suitable polyisocyanates are 1,6-hexamethylene diisocyanate, 2,4-toluene diisocyanate and triphenylmethane p,p,p-triisocyanate. Suitable glycols are glycerol, ethylene glycol, 1,4-butanediol, and hexametriol. Alkyd resins may be prepared by reacting a saturated or unsaturated polycarboxylic acid or a mixture of two or more, such as adipic acid, succinic acid, phthalic anhydride, aconitic acid, maleic anhydride and fumaric acid with a molar excess of a polyhydric alcohol.

A suitable moldable solid polyurethane may be prepared by reacting at 180° C. for seven hours three moles of adipic acid, two moles of 1,3-butanediol, and two moles of trimethylolpropane to produce a hydroxy alkyd resin, and then reacting for one hour at 125° C. with one mole of toluene diisocyanate. The resulting resin may then be molded into bearings of the desired shape by heating within the range of 150° C. to 200° C.

It has been observed that bearing members formed of polyurethanes possess very desirable properties as compared to bearing members formed of metallic materials. For example, polyurethane bearings possess superior frictional and wearing properties as compared to conventional metallic bearings. Furthermore, bearings formed of a polyurethane are lighter in weight, are of a more resilient nature and are more resistant to corrosion than metallic bearings. In addition, polyurethane bearings are readily machineable and provide good insulation against vibration and sound which renders their use in electrical instruments very desirable.

Other synthetic resins which exhibit the above enumerated desirable properties are commercially available. For example, satisfactory results have been obtained with guide bearings formed of synthetic linear polyamide resins of the type described in U.S. Patent No. 2,246,086.

If desired, the polyurethanes employed in the formation of bearing members in accordance with the teachings of the invention may be mixed with a large variety of modifying agents, such as fillers and reenforcing agents. For example, solid lubricants, such as graphite, powdered mica or asbestos may be incorporated to provide desirable frictional properties of the bearing member.

Referring now to Fig. 2, there is illustrated in detail a bearing member 53 constructed in accordance with the present invention. The member 53 is preferably cast from a suitable synthetic resin in the form of a cylinder having a pair of opposing end surfaces 55 and 57 connected by a lateral surface 58.

In the specific embodiment of Fig. 2, the member 53 is formed with a cavity 59 extending from the end surface 57 toward the end surface 55 to define with the surface 55 an end wall 61. The cavity 59 has a side wall with a shoulder 63 of the side wall defining an enlarged cavity portion 65 adjacent the surface 57 communicating with a restricted cavity portion 67 adjacent the surface 55.

In order to provide a bearing surface for the needle shaft 41 the end wall 61 is provided with an opening 69 which communicates with the restricted cavity portion 67. The opening 69 has a diameter which is somewhat smaller than the diameter of the cavity portion 67. The side wall 71 of the opening 69 provides a lateral bearing surface for the shaft 41. The side wall 71 is preferably curved as illustrated in Fig. 2 to provide a minimum area of engagement between the shaft 41 and the side wall 71.

The bearing member 53 is preferably formed with integral ribs or projections 73 which extend from the lateral surface 58 of the member 53. The projections 73 serve as grips to facilitate the installation and removal of the member 53 relative to the rotor shaft 11. Furthermore, the formation of the projections 73 during the casting of the member 53 is effective to delay the cooling of the cast member 53 with the result that a certain amount of elasticity of the member 53 is retained in the area of the projections 73.

The projections 73 may be of any suitable formation and number. In the specific embodiment of the invention two projections 73 are provided. As shown in Fig. 3, the projections 73 are spaced approximately 180° relative to each other about the axis of the member 53 to provide a symmetrical structure.

In order to provide a snug fit between the member 53 and the shaft 11, the diameter of the enlarged cavity portion 65 is preferably made slightly smaller than the diameter of the end portion 13 of the shaft 11 when the member 53 is in an untensioned condition. As shown in Fig. 2, the portion 13 of the shaft 11 extends into the enlarged cavity portion 65 for frictional engagement with the side wall of the cavity portion 65. For the purpose of preventing relative movement between the member 53 and the shaft 11 axially of the shaft 11 in a direction toward the portion 5 of the structure 3 the end portion 13 of the shaft 11 is positioned to engage the shoulder 63 of the side wall of the cavity 59.

As illustrated in the drawings, the shaft 11 and the shaft 41 are positioned in spaced relation with respect to each other to extend along a common axis. With the bearing member 53 assembled to the shaft 11, the end portion 45 of the shaft 41 is positioned to project through the opening 69 of the end wall 61 of the member 53 into the restricted cavity portion 67. The portion 45 of the shaft 41 and the opening 69 are proportioned so that the portion 45 engages the lateral bearing surface provided by a portion of the side wall 71 of the opening 69.

In order to assemble the member 53 to the shaft 11 the member 53 is conveniently pressed over the end portion 13 of the shaft 11 so that the portion 13 is received in the enlarged cavity portion 65 to engage the shoulder 63. The resilient formation of the member 53 permits a snug fit between the member 53 and the portion 13 so that the bearing member 53 will rotate with the shaft 11 relative to the needle shaft 41.

The bearing member 53 is readily removed from the shaft 11 by effecting relative movement between the member 53 and the shaft 11 in a direction to withdraw the portion 13 from the enlarged cavity portion 65. The operations required to effect such installation and removal of the member 53 are conveniently performed manually without the necessity of employing tools.

Although the invention has been described with reference to certain specific embodiments thereof, numerous modifications falling within the spirit and scope of the invention are possible.

I claim as my invention:

1. In a watthour meter, a first shaft including a first end portion having a first diameter, a second shaft including a second end portion having a second diameter greater than the first diameter, an electroconductive disc secured to the second shaft for rotation therewith, said disc being subjected to and rotatable by magnetic flux, and means mounting said second shaft for rotation relative to said first shaft about a vertical axis when the meter is in an operative position, said means including a bearing member of resilient construction formed of a polyurethane synthetic resin, said bearing member being capable of operation without an applied lubricant, said bearing member having first and second opposing end surfaces with a cavity extending from said first end surface toward the second end surface to define with the second end surface an end wall of the bearing member, said end wall having a restricted opening communicating with said cavity, said restricted opening having a side wall providing a lateral bearing surface for said first shaft, said first shaft end portion projecting through the restricted opening into said cavity with the first shaft engaging the bearing surface, said second shaft end portion projecting from said first end surface into said cavity in spaced relation with respect to said first shaft end portion, said cavity having a third diameter smaller than said second diameter when the bearing member is in an untensioned condition to provide a press fit condition between the bearing member and said second shaft.

2. In an electrical instrument, a stator structure including upper and lower stator portions spaced along a vertical axis when the instrument is in an operative position, a needle shaft carried by said upper stator portion having an end portion projecting toward said lower stator portion, a rotor structure including a driven shaft having an end portion with a first diameter projecting toward said needle shaft end portion, and means mounting the rotor structure for rotation relative to the stator structure about said vertical axis, said means including a bearing member having first and second opposing end surfaces connected by a lateral surface, said bearing member having a cavity extending from the first end surface toward the second end surface to define with the second end surface an end wall of the bearing member, said cavity having a first side wall with a shoulder defining an enlarged cavity portion adjacent the first end surface communicating with a restricted cavity portion adjacent the second end surface, said restricted cavity portion having a second diameter, said end wall having an opening with a third diameter smaller than said second diameter communicating with the restricted cavity portion, said opening having a curved second side wall providing a curved lateral bearing surface for said needle shaft, said needle shaft end portion projecting from said second end surface through the opening into the restricted cavity portion with the needle shaft engaging the bearing surface, said bearing member being of resilient construction formed of a synthetic resin selected from the group consisting of a linear polyamide synthetic resin and a polyurethane synthetic resin, said bearing member being capable of operation without an applied lubricant, said enlarged cavity portion having a fourth diameter smaller than said first diameter when the bearing member is in an untensioned condition, said driven shaft end portion projecting into the enlarged cavity portion from said first end surface for frictional engagement with said first side wall to engage said shoulder, said bearing member having integral projection means extending from the lateral surface thereof.

3. A bearing member comprising a body having opposing end surfaces connected by a lateral surface, said body having a cavity extending from one of said end surfaces toward the other of said end surfaces to define with the other of said end surfaces an end wall of the body, said cavity having a first side wall with a shoulder defining an enlarged cavity portion adjacent said one of said end surfaces communicating with a restricted cavity portion adjacent said other of said end surfaces, said restricted cavity portion having a first diameter, said end wall having an opening with a second diameter smaller than said first diameter communicating with the restricted cavity portion, said opening having a second side wall providing a bearing surface, said body being of resilient construction formed of a polyurethane synthetic resin and being capable of operation without an applied lubricant, said body having integral projection means extending from the lateral surface thereof.

4. In an alternating current watthour meter having a magnetic flux producing member, a pair of supports, a shaft extending between said supports, a plate member carried by said shaft intermediate the end portions thereof and lying in a plane extending substantially perpendicular to the axis of rotation of said shaft, said axis of rotation of said shaft when the meter is in its operating condition extending in a substantial vertical direction and said plate member being continually subjected to vibratory forces set up by the action of the flux producing member, means carried by one of said pair of supports for rotatably supporting one end of said shaft, a second means coacting with the other of said pair of supports for supporting the other end of said shaft, said second means comprising a hollow substantially tubular member of a material from the group consisting of polyurethane and nylon, said other end portion of said shaft extending into one end portion of said tubular member, said one end portion of said tubular member having an unstretched internal diameter less than the diameter of said other end portion of said shaft, the other end portion of said tubular member being closed by a centrally apertured end wall, a rod carried by said other support concentrically with said axis and extending toward said other end of said shaft through said aperture in said tubular member whereby said tubular member and said shaft are guided for rotation about said rod.

References Cited in the file of this patent

UNITED STATES PATENTS

| | | |
|---|---|---|
| 1,952,161 | Faus | Mar. 27, 1934 |
| 2,025,830 | Rosmait | Dec. 31, 1935 |
| 2,246,086 | Austin | June 17, 1941 |
| 2,424,883 | Habgood et al. | July 29, 1947 |
| 2,431,921 | Cook | Dec. 2, 1947 |
| 2,541,790 | Sugden et al. | Feb. 13, 1951 |
| 2,621,166 | Schmidt et al. | Dec. 9, 1952 |

FOREIGN PATENTS

| | | |
|---|---|---|
| 53,686 | Austria | May 25, 1912 |
| 636,066 | Great Britain | Apr. 19, 1950 |
| 148,575 | Sweden | Jan. 25, 1955 |

OTHER REFERENCES

Fiat Final Report No. 1301, published by Joint Intelligence Objectives Agency, Washington, D.C., Sept. 15, 1947, pages 6 and 7.